United States Patent
Bergmiller et al.

(10) Patent No.: US 9,038,699 B2
(45) Date of Patent: May 26, 2015

(54) BLIND ASSEMBLY FOR A VEHICLE

(75) Inventors: Alexander Bergmiller, Koenigsbrunn (DE); Martin Pollak, Puchheim (DE); Sebastian Glasl, Viernheim (DE); Robert Würl, Moorenweis (DE); Andreas Rockelmann, Munich (DE); Frank Koslowski, Moorenweis (DE); Steven Henry Klotz, Commerce Township, MI (US); Anthony McCall, Rochester Hills, MI (US)

(73) Assignee: WEBASTO SE, Stockdorf (DE)

( * ) Notice: Subject to any disclaimer, the term of this patent is extended or adjusted under 35 U.S.C. 154(b) by 69 days.

(21) Appl. No.: 12/296,611

(22) PCT Filed: Apr. 12, 2007

(86) PCT No.: PCT/DE2007/000638
§ 371 (c)(1),
(2), (4) Date: Oct. 9, 2008

(87) PCT Pub. No.: WO2007/118455
PCT Pub. Date: Oct. 25, 2007

(65) Prior Publication Data
US 2009/0165965 A1   Jul. 2, 2009

(30) Foreign Application Priority Data
Apr. 13, 2006   (DE) .......................... 10 2006 017 538

(51) Int. Cl.
*A47G 5/02* (2006.01)
*E06B 9/56* (2006.01)
(Continued)

(52) U.S. Cl.
CPC .............. *B60J 7/0015* (2013.01); *B60J 1/2044* (2013.01); *B60J 1/2052* (2013.01); *B60J 1/2061* (2013.01)

(58) Field of Classification Search
CPC ........ B60J 7/0015; B60J 1/208; B60J 1/2013; B60J 1/2016; B60J 1/2019; B60J 1/2022; B60J 1/2025; B60J 1/2027; E06B 9/58; E06B 9/581; E06B 9/11; E06B 9/40; E06B 9/42; E06B 9/13; E06B 9/52; E06B 9/54
USPC ......... 160/265, 370.22, 266, 268.1, 270, 271, 160/269, 273.1; 296/97.9, 97.11, 216.01
See application file for complete search history.

(56) References Cited

U.S. PATENT DOCUMENTS 2,349,226 A * 5/1944 Thomas ...................... 160/273.1
5,271,448 A * 12/1993 Delgado ....................... 160/265
(Continued)

FOREIGN PATENT DOCUMENTS

DE    19739919      3/1999
DE    19722474 C2   6/2001
(Continued)

OTHER PUBLICATIONS

International Search Report dated Nov. 7, 2007.

*Primary Examiner* — Katherine Mitchell
*Assistant Examiner* — Jeremy Ramsey
(74) *Attorney, Agent, or Firm* — Fitch, Even, Tabin & Flannery LLP

(57) ABSTRACT

The invention relates to a blind assembly comprising a blind web (11) which is provided with one respective flexible, flat guide strip (10) along both lateral edge areas. Said guide strip (10) is guided inside a guide along the direction of extension of the blind in order to stretch the blind web. The base of the guide strip (10) is guided parallel to adjacent areas of the blind web. The inventive blind assembly further comprises at least one blind coupling with which at least one of the guide strips engages in a removable, positive manner via an entraining element (12) and via which the guide strip can be extended along with the blind web.

16 Claims, 4 Drawing Sheets

(51) Int. Cl.
   *B60J 3/00*   (2006.01)
   *B60J 7/00*   (2006.01)
   *B60J 1/20*   (2006.01)

(56) References Cited

U.S. PATENT DOCUMENTS

| | | | | |
|---|---|---|---|---|
| 5,526,865 | A * | 6/1996 | Coenraets | 160/272 |
| 6,068,040 | A * | 5/2000 | Magro et al. | 160/133 |
| 6,899,380 | B2 * | 5/2005 | Kralik et al. | 296/214 |
| 7,302,988 | B2 * | 12/2007 | Heitel | 160/274 |
| 2007/0125506 | A1 * | 6/2007 | Eiselt et al. | 160/370.22 |
| 2007/0277941 | A1 * | 12/2007 | Jansen et al. | 160/271 |

FOREIGN PATENT DOCUMENTS

| | | |
|---|---|---|
| DE | 10019787 A1 | 10/2001 |
| DE | 10122570 | 7/2002 |
| DE | 10122570 C1 | 7/2002 |
| DE | 10237231 B3 | 2/2004 |
| DE | 10253816 | 2/2004 |
| DE | 10331514 A1 | 2/2005 |
| EP | 1426548 | 6/2004 |
| EP | 1584509 | 10/2005 |
| EP | 1616737 | 1/2006 |
| EP | 1669537 | 6/2006 |
| WO | WO 2005/068236 | 7/2005 |
| WO | WO 2007/068217 A1 | 6/2007 |

* cited by examiner

BLIND ASSEMBLY FOR A VEHICLE

This application is a 35 U.S.C. §371 National Stage entry of PCT/DE2007/000638, filed Apr. 12, 2007, which claims priority from German Patent Application No.: DE 10 2006 017 538.7, filed Apr. 13, 2006, the contents of which are herein incorporated by reference.

The present invention relates to a blind assembly for a vehicle according to the preamble of claim 1.

Blind assemblies for use in a vehicle serve, for example, as protection against incoming sunshine underneath a fixed glass panoramic roof or underneath a transparent sliding panel or as a cover for a stowage space. In order to tension the blind web in such a blind assembly not only in the longitudinal direction, but also transversely with respect to the direction of extension, blind systems are known where lateral guides are used for transverse tensioning. In this connection DE 197 39 919 A1 describes a blind assembly in which the side edges of a blind web are designed such that they engage inside lateral guide rails. Thus the edge zones of the blind web are secured so as prevent fluttering and oscillating movements since, by means of corresponding spacing of the guide rails on either side relative to the width of the blind web, the blind web can be tensioned transversely with respect to the direction of extension. In the case of DE 197 39 919 A1 the side edges of the blind web are provided for this purpose with edge reinforcements which can be bent out from the plane of the blind web so as to engage in angled guide zones, but which can be brought back into their extended flat position where they are not bent out, in order to roll up the blind web onto the winding tube. Further, commonly owned U.S. Publication 2008/0197655 is incorporated by reference herein for all purposes.

In the case of a blind according to the preamble of claim 1, the lateral edge zones of the blind web each have a flat guide strip, the base of which is guided parallel to the plane of extension of the blind. There is therefore no pivoting or even only partial bending away of the guide strips out of such a plane.

In the case of the blind system according to DE 197 39 919 A1 a pull cable is firmly fastened via an entraining element to a cross-rod at the end of the blind web for movement of the blind. This has the disadvantage that the assembly of such blind systems during construction of a vehicle or for example a roof module as well as disassembly (for repair purposes) is made difficult.

It is the object of the present invention to provide a blind assembly for a vehicle in which the abovementioned disadvantages are overcome.

This object is achieved by means of a blind assembly according to claim 1.

In the inventive solution to the object according to claim 1 a blind web has at least one blind coupling with which at least one of the guide strips engages in a releasable positive manner via an entraining element and via which the guide strip can be extended together with the blind web. As a result of the connection by means of releasable positive engagement between guide strip and blind coupling it is ensured that both assembly and if necessary also disassembly of the blind assembly according to the invention is significantly simplified. Positive engagement is understood here as meaning that a contour of the entraining element engages removably inside a corresponding opposite contour of the blind coupling.

Further preferred embodiments of the invention are described in the subclaims.

In a preferred embodiment of the invention the positive engagement is achieved by designing the contour in the form of at least one groove on the entraining element or on the blind coupling, the corresponding opposite contour on the blind coupling or the entraining element being designed in the form of a matching projection. Preferably such a groove is provided transverse with respect to the direction of extension of the blind and the entraining element provided with a groove or the blind coupling in this connection may be designed so as to be overall approximately U-shaped.

In order to keep the constructional height of the blind assembly as small as possible, in a further preferred embodiment of the invention the entraining element is designed with a flat cross-section, i.e. with a lower height, the base of the entraining element being directed parallel to the base of the guide strip.

In order to operate such a blind assembly, in further preferred embodiments the blind coupling is connected to a drive cable by means of which for example an electric motor can move the blind coupling and, together therewith, the entraining element.

Preferably the blind coupling is guided together with the entraining element inside a common guide channel of a guide rail in such a way that the positive engagement between them is maintained. In this respect the geometrical form of the guide channel is chosen such that the blind coupling engaged with the entraining element can move displaceably inside the guide channel, although there is not enough space inside the guide channel for the entraining element and the blind coupling to be moved away from each other to the point of causing disengagement of these two components.

The entraining element of a blind assembly according to the invention is preferably mounted on the end of the associated guide strip and may be designed as a plastic part which is molded onto the guide strip. In order to improve the retaining force of such an overmolding on the guide strip the guide strip may have one or more openings in the region where the entraining element is molded thereon, it being possible in addition to provide a burr or a bent-open part in the region of the opening.

As an alternative to the molding process the entraining element can however also be clipped onto the guide strip and for this purpose is provided for example with a film hinge or designed as two parts. In such two-part embodiments of the entraining element a gluing process or a welding process may also be considered for the securing process.

The invention will be explained more fully below by way of example with reference to the accompanying drawings in which.

Figure 1A:
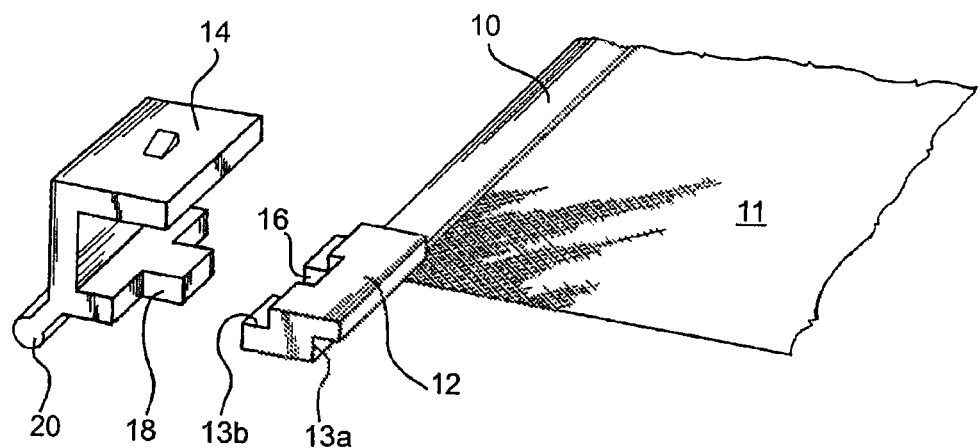
FIG. 1a shows a perspective view of a blind assembly according to the invention with a blind coupling and an entraining element.

FIG. 1a shows a guide strip 10 which is mounted on a blind web 11 in such a way that its base extends parallel to adjacent zones of the blind web. An entraining element 12 is mounted on the end of the guide strip 10 and is able to form a releasable positive connection with a blind coupling 14. Blind coupling 14 and entraining element 12 are shown separated merely for the sake of greater clarity so that the form of the two components is more easily visible.

The entraining element 12 has a groove 16 inside which, in the mounted condition, a correspondingly matching opposite part in the form of a projection 18 on the blind coupling 14 of the blind assembly engages. The guide strip 10, the entraining element 12 and the blind coupling 14 are displaceably mounted on the vehicle within a guideway 17 of a guide rail 15 (see FIG. 1b), preferably a common profiled rail being used to guide entraining element and blind coupling. Since the entraining element 12 can be guided inside a common guide channel with the projection 18, nevertheless independently of the blind coupling 14, the entraining element is designed so that it can be correspondingly embraced by the guide rail. This is achieved in the embodiment according to FIG. 1a by providing the entraining element 12 with two indentations 13a and 13b which ensure separate guiding of the entraining element independently of the blind coupling 14 inside a common guide channel of a guide rail. This is explained more fully further below with the aid of FIG. 1b. The blind coupling 14 has furthermore a connecting part 20 for a drive member (not shown) such as, for example, a cable which is guided in a compressively rigid manner.

Figure 1B:
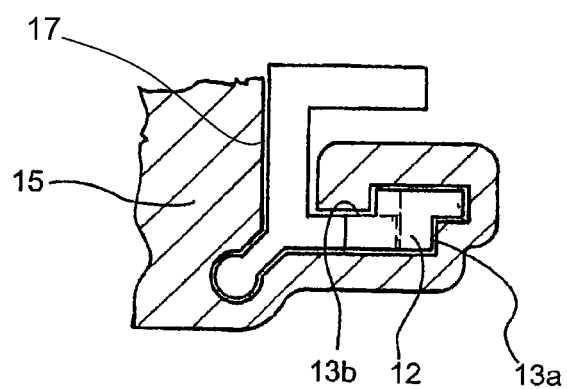
FIG. 1b shows a cross-section through a guide rail with a blind coupling according to the invention and an entraining element.

In FIG. 1b an entraining element 12 together with a blind coupling 14 is shown in cross-section, entraining element and blind coupling being guided inside a guide rail 15. As can be seen from the cross-sectional illustration, the two indentations 13a and 13b of the entraining element 12 result in the guide rail 15 being able to embrace and guide the entraining element such that the latter, despite the possibility of engagement of the blind coupling with the entraining element, is guided separately and without play by the guide rail. Generally this is achieved by designing the entraining element and the guide rail in such a way that the entraining element cannot come out of the guide rail in the transverse direction independently of the blind coupling.

Figure 2:
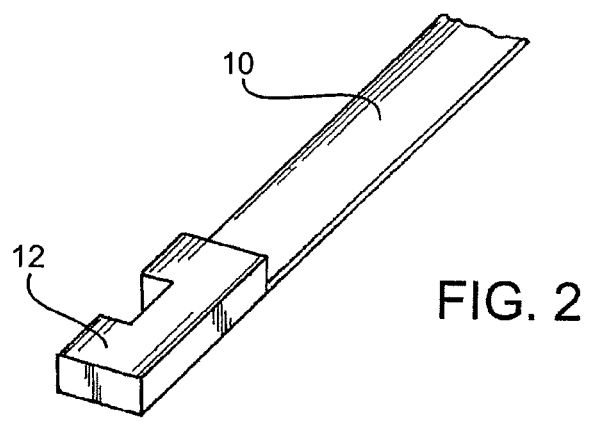
FIG. 2 shows an entraining element which is molded onto a guide strip.

FIG. 2 shows a further embodiment of an entraining element 12 which is made of plastic and is molded onto a guide strip 10.

Figure 3A:
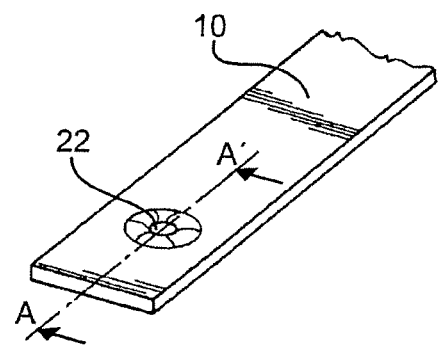
FIGS. 3a, 3b, 4a and 4b show a respective guide strip with an opening in the region onto which an entraining element is to be molded.
Figure 3B:
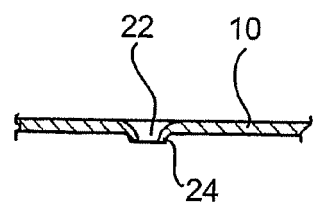

In order to increase further the retaining force of such a molded entraining element 12 on a guide strip 10, the guide strip 10 can be provided in the region of the molding with an opening 22, as shown in FIG. 3a. During the entraining element molding process (as shown in FIG. 2 for example) plastic penetrates into the opening 22, thus ensuring better fixing of an entraining element on the rail 10. In order to improve this effect still further, the opening 22, as shown in FIG. 3b sectioned along the section A-A' in FIG. 3a, the opening 22 may be provided with a burr 24 which prevents even further removal of a molded entraining element.

Figure 4A:
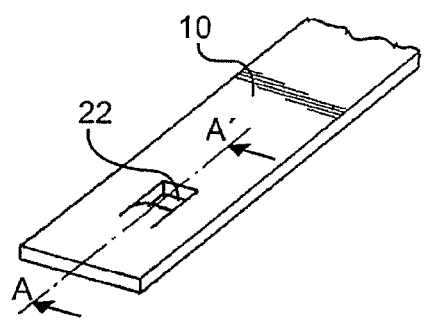
Figure 4B:
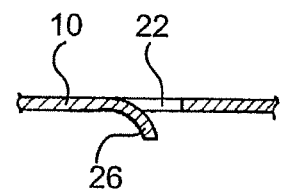

An alternative solution thereto respect is shown in FIGS. 4a and 4b, where a guide strip 10 has an opening 22 which is formed by means of a bent-open part 26 of a U-shaped slit.

Figure 5:
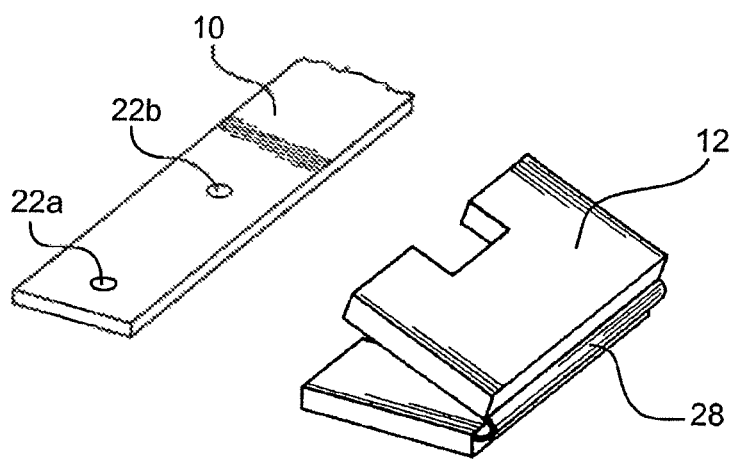
FIG. 5 shows a guide strip with an entraining element with film hinge for clipping onto the guide strip.

FIG. 5 shows an alternative form of an entraining element 12 which is designed so as to be foldable by means of a film hinge 28 and has studs (not visible here) which in the assembled condition penetrate through openings 22a and 22b of a guide strip 10.

Figure 6:
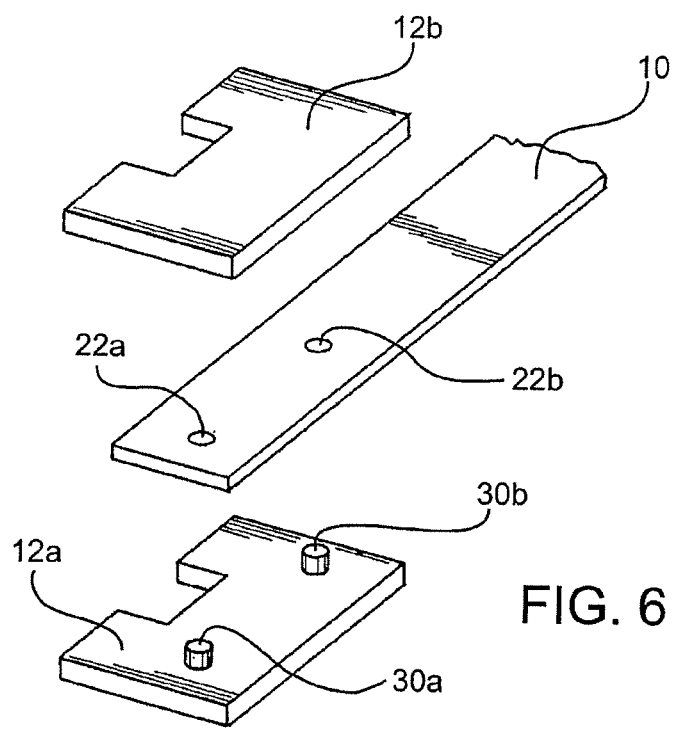
FIG. 6 shows an entraining element designed as two parts for mounting on a guide strip.

An entraining element 12 may be also designed as two parts as shown in FIG. 6 with a bottom part 12a and a top part 12b, the two parts being able to be fixed onto the guide strip 10 by means of hot-pressing, gluing, clipping, ultrasound welding or high-frequency welding. The connection is also achieved here among other things by means of two studs 30a and 30b which pass through openings 22a and 22b of the guide strip 10 and at the same time prevent removal of the two-part entraining element 12a, 12b from the guide strip 10.

Figure 7:
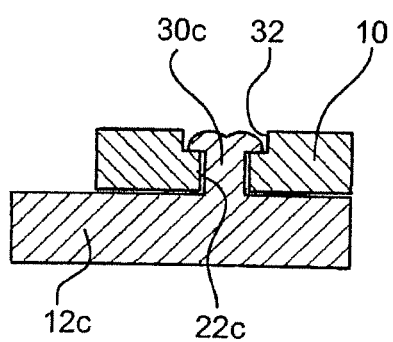
FIG. 7 shows an entraining element designed as a single piece with guide strip fixed thereon.

FIG. 7 shows a modified embodiment where the entraining element 12c is designed as one piece and is connected to the guide strip 10 by means of studs 30c which are guided during assembly through holes 22c provided in the guide strip. In order to ensure unwanted separation of the entraining element from the guide strip also outside of the guide rail, the studs 30c, after they have been introduced into the openings 22c of the guide strip 10, may be hot-stamped or hot-swaged and the openings 22c of the guide strip 10 may have for this purpose recesses along their edge directed outwards in the assembled condition in order to receive the end zones of the studs 30c which have been widened by the hot-stamping or hot-swaging process.

Preferably the entraining element is formed in such a way that it can be used on both sides of the blind assembly. For example in the embodiment shown in FIG. 6 this is accomplished by designing the entraining element so that it is symmetrical in the axial direction such that it can be connected to a guide strip and subsequently to a blind coupling both in the position shown as well as in a position rotated through 180°.

What is claimed is:

1. A blind assembly for a vehicle defining a direction of extension of a blind, comprising:
    a blind web having two opposite lateral edge zones and defining a direction of extension,
    two spaced guides extending along the direction of extension and each being placed at an opposite one of the lateral edge zones,
    one flexible, flat, guide strip attached to the blind web and extending longitudinally along each of the lateral edge zones in the direction of extension, each guide strip being guided inside one of the guides in a guideway along the direction of extension in order to stretch the blind web, each guide strip having a base guided parallel to adjacent zones of the blind web,
    an entraining element attached to at least one of the guide strips,
    at least one blind coupling independent of the entraining element engaging at least one of the guide strips in a releasable positive engagement via a releasable coupling with the entraining element to extend the guide strip and, together therewith, the blind web, and
    wherein the entraining element and the blind coupling are displaceably and slidably mounted within the guideway of at least one guide rail, and wherein the releasable coupling comprises a groove and a corresponding projection between the entraining element and the at least one blind coupling.

2. The blind assembly of claim 1, characterized in that the entraining element or at least one blind coupling has at least one groove inside which a projection of the blind coupling or the entraining element engages and thus forms the releasable positive connection with the entraining element.

3. The blind assembly of claim 2, characterized in that at least one groove extends transversely with respect to the direction of extension.

4. The blind assembly of claim 2, characterized in that the entraining element or the blind coupling is designed so as to be substantially U-shaped.

5. The blind assembly of claim 1, characterized in that the entraining element has a flat cross-section and a base directed parallel to the base of the guide strip.

6. The blind assembly of claim 1, characterized in that each guide rail has a guide channel, and at least one blind coupling together with the entraining element is guided inside the guide channel so that the positive engagement between the blind coupling and the entraining element is maintained.

7. The blind assembly of claim 1, characterized in that the entraining element is mounted on the end of the guide strip which faces the direction of extension.

8. The blind assembly of claim 7, characterized in that the entraining element has studs and the guide strip has openings inside which, after assembly of the blind assembly, the studs of the entraining element are received.

9. The blind assembly of claim 1, characterized in that the entraining element is made of plastic and is molded onto the guide strip.

10. The blind assembly of claim 9, characterized in that the guide strip in the region where the entraining element is molded onto it has an opening which is overmolded and through which the plastic penetrates.

11. The blind assembly of claim 10, characterized in that the guide strip has a burr or a bent-open part in the region of the opening.

12. The blind assembly of claim 1, characterized in that the entraining element has a film hinge and, for assembly on the guide strip, can be clipped onto the latter.

13. The blind assembly of claim 1, characterized in that the entraining element in the unassembled condition is designed as two parts and, for assembly on the guide strip, is clipped, glued or welded thereon.

14. The blind assembly of claim 1, characterized in that the entraining element in the unassembled condition is designed as one piece and, for assembly on the guide strip, is clipped, glued or welded thereon.

15. The blind assembly of claim 8, characterized in that the opening of the guide strip has a recess along its edge directed outwards in the assembled condition and the stud of the entraining element is made of plastic, during assembly the free end of the stud arranged in the region of the recess being deformed in order to fill the recess at least partially.

16. The blind assembly of claim 1, wherein the entraining element has indentations (13a) and (13b) to ensure separate guiding of the entraining element independent of the blind coupling inside a common guide channel of the guide rail.

* * * * *